United States Patent [19]

Ikeda et al.

[11] Patent Number: 4,642,732

[45] Date of Patent: Feb. 10, 1987

[54] DIELECTRIC CERAMIC COMPOSITION AND METHOD OF PRODUCING SAME, AND A MONOLITHIC CAPACITOR

[75] Inventors: Masaaki Ikeda; Wataru Takahara; Junichi Iteguchi; Hiroyuki Satoh; Shyuji Itoh, all of Tokyo, Japan

[73] Assignee: TDK Corporation, Tokyo, Japan

[21] Appl. No.: 855,572

[22] Filed: Apr. 25, 1986

[30] Foreign Application Priority Data

Apr. 26, 1985 [JP] Japan .................................. 60-89999

[51] Int. Cl.$^4$ ........................ H01G 4/10; H01G 7/00; C04B 35/48
[52] U.S. Cl. .................................. 361/321; 29/25.42; 501/138
[58] Field of Search ........................ 29/25.42; 264/61; 501/138; 361/321, 433

[56] References Cited

U.S. PATENT DOCUMENTS

| | | | |
|---|---|---|---|
| 3,775,142 | 11/1973 | Roup | 361/321 X |
| 3,920,781 | 11/1975 | Eror et al. | 361/321 X |
| 4,081,857 | 3/1978 | Hanold | 501/138 X |

FOREIGN PATENT DOCUMENTS 50615  4/1980  Japan .................................. 501/138

*Primary Examiner*—Donald A. Griffin
*Attorney, Agent, or Firm*—Armstrong, Nikaido, Marmelstein & Kubovcik

[57] ABSTRACT

The ceramic dielectric composition can be fired in a reducing or nonoxidizing atmosphere and has the formula:

$$(Ba_{1-x}Sr_xO)_aTi_{1-y}Zr_yO_2 + \alpha((1-z)MnO + zCoO) + \beta((1-t)A_2O_5 + tL_2O_3) + wSiO_2,$$

wherein:
A = Nb, Ta, V;
L = Y or a rare earth element;
$0.002 \leq x + y + 1.7\alpha z \leq 0.250$;
$0.000 \leq z \leq 0.980$;
$0.990 \leq a \leq 1.020$;
$0.010 \leq \alpha \leq 15.00$ (mol %);
$0.01 \leq \beta/\alpha \leq 0.55$;
$0.000 \leq t \leq 0.980$; and,
$0.002 \leq w \leq 1.00$ (wt %).

12 Claims, 3 Drawing Figures

DIELECTRIC CERAMIC COMPOSITION AND METHOD OF PRODUCING SAME, AND A MONOLITHIC CAPACITOR

BACKGROUND OF THE INVENTION

1. Field of the Invention

The present invention relates to a non-reducing, dielectric ceramic composition, particularly a dielectric ceramic composition which exhibits a high dielectric constant, a small change in the dielectric constant depending upon temperature, a small secular change, a stable dielectric constant when DC bias is applied, a low dielectric loss, and a high resistivity, and which can be fired at a relatively low temperature.

The present invention also relates to a monolithic capacitor.

2. Description of the Related Arts

Barium titanate provides a dielectric ceramic composition exhibiting a high dielectric constant, a small change in the dielectric constant and a small dielectric loss, when it is doped with cobalt-, tantalum-, or samarium-niobate, bismuth stannate, or bismuth-, tantalum-, or niobium-zirconate. The thus-provided dielectric ceramic composition makes it possible to produce monolithic ceramic capacitors having a small size and a high capacitance, as disclosed in U.S. Pat. No. 3,920,781. These monolithic ceramic capacitors are used as circuit elements of an IC, broadly for application in communication devices, computers, television-receivers, and the like.

The conventional methods for producing the monolithic ceramic capacitors are as set forth in the preamble of claim 10 and are roughly classified into the printing method and the sheet method. According to the printing method, a slurry of dielectric material is prepared; is printed into a predetermined shape by means of, for example screen printing, followed by drying; an electrode paste is printed on the dried dielectric material; and a next layer of the dielectric material is printed. This procedure is repeated to form a monolithic. According to the sheet method, a sheet of dielectric material is produced by, for example, the doctor blade method, and an electrode paste is printed on the sheet of dielectric material. This procedure is repeated to produce a plurality of the dielectric material-sheets with an electrode thereon, which are laminated one upon the other and thermally pressure-bonded. The monolithic obtained by this or any other appropriate procedure is fired at a temperature of from 1250° C. to 1400° C. in an ambient atmosphere to obtain a sintered body. External lead electrodes are baked on the sintered body to provide a conduction with electrodes embedded in the interior of a sintered body, i.e., the inner electrodes. Since the inner electrodes are sandwiched between the sheets of dielectric material and both the inner electrodes and the dielectric material are simultaneously fired, the material requirements of the inner electrodes are such that the material be in electrical contact with the dielectric material at its firing temperature, and is neither oxidized at the sintering temperature in the ambient atmosphere nor reacted with the dielectric material at the firing temperature. Noble metals, such as platinum and palladium, meet such requirements and have been used as the electrode material in most cases. Noble metals are very stable but are expensive. Accordingly, the cost of inner electrodes made of a noble metal amounts to approximately 20–50% of the cost of the monolithic ceramic capacitor.

U.S. Pat. No. 3,920,781, Japanese Unexamined Patent Publication Nos. 53-24600 and 59-16323 propose to use base metals for the inner electrode of a monolithic capacitor.

SUMMARY OF THE INVENTION

It is an object of the present invention to provide a dielectric ceramic material, in which a drastic decrease in resistivity, which will make it unusable for the capacitor, does not occur during the firing in a neutral or reducing atmosphere.

It is another object of the present invention to provide a dielectric ceramic material which exhibits a high insulation resistance, a low dielectric loss, a high dielectric constant, a low temperature-dependence of a dielectric constant, and a low secular change of a dielectric constant.

It is still another object of the present invention to provide a dielectric ceramic material which can be fired at a relatively low temperature.

In accordance with the objects of the present invention there is provided a dielectric, ceramic material having a composition:

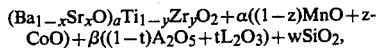
$(Ba_{1-x}Sr_xO)_aTi_{1-y}Zr_yO_2 + \alpha((1-z)MnO + zCoO) + \beta((1-t)A_2O_5 + tL_2O_3) + wSiO_2$, wherein:
A = Nb, Ta, V;
L = Y or a rare earth element;
$0.002 \leq x + y + 1.7\alpha z \leq 0.250$;
$0.000 \leq z \leq 0.980$;
$0.990 \leq a \leq 1.020$;
$0.010 \leq \alpha \leq 15.00$ (mol %);
$0.01 \leq \beta/60 \leq 0.55$;
$0.000 \leq t \leq 0.980$; and
$0.002 \leq w \leq 1.00$ (wt %).

In accordance with the present invention, there is also provided a monolithic capacitor comprising: a plurality of layers of the dielectric ceramic composition mentioned above; a plurality of layers of base metal electrodes, each layer being bonded between a pair of the dielectric ceramic compositions; and a pair of external electrodes electrically and selectively connected to the base metal electrodes.

The process for producing a monolithic ceramic body is characterized by comprising: separately preparing compounds expressed by $BaTiO_3$, $SrTiO_3$, $BaZrO_3$, and $SrZrO_3$, respectively and finely dividing these compounds; and adding an Mn oxide-bearing material, a Co oxide-bearing material, a material bearing an oxide of at least one element selected from the first group consisting of Nb, Ta, and V, and a material bearing an oxide of at least one element selected from the second group consisting of Y and a rare earth element, to the separately prepared compounds; and then mixing these added compounds to obtain a barium titanate-based composition having a formula of the above ceramic dielectric composition.

DESCRIPTION OF THE PREFERRED EMBODIMENTS

Figure 1:
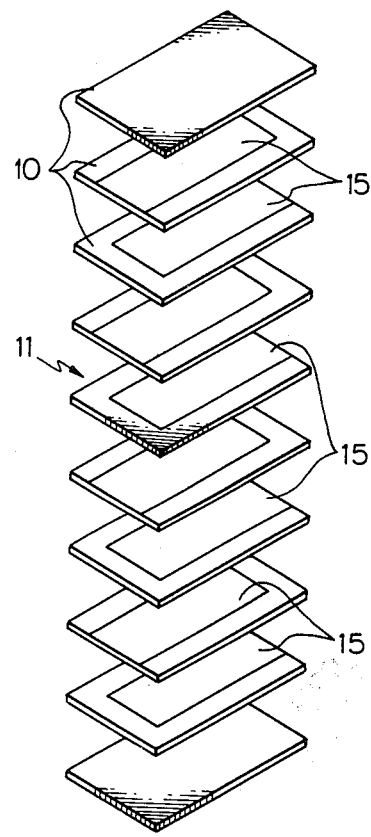
FIG. 1 illustrates the strips of dielectric ceramic composition and electrodes.
Figure 2:
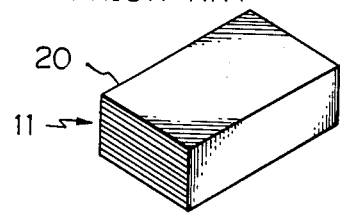
FIG. 2 illustrates the fired body.
Figure 3:
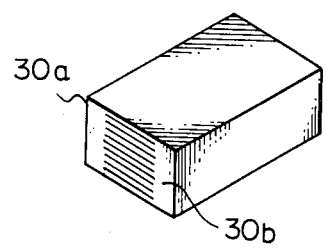
FIG. 3 illustrates the monolithic capacitor.

A method for producing a monolithic capacitor is described with reference to FIGS. 1 through 3.

The sheets comprising the dielectric ceramic composition are formed by, for example, molding a mixture of the powder of the dielectric ceramic capacitor and an organic binder. The sheets are dried and then cut in the form of strips 10. The electrodes 15 are formed on all of the strips 10, except for the uppermost and lowermost strips 10. The electrodes 15 consist of at least one metal selected from the groups of Ni, Fe, Cr, Co, W, and Mo, preferably Ni. The electrodes 15 are formed by a known screen-printing method. The strips 10 and electrodes 15 are laminated as shown in FIG. 2, and the monolithic 20 is fired in a reducing or neutral atmosphere. The fired body is then subjected to the formation of external electrodes 30a and 30b in electric contact with the strips 10 exposed at the respective sides of the fired article. In the fired body, the thickness of each strip 10 is in the range of from 20 to 40 μm, and the thickness of each electrodes 15 is in the range of from 2 to 5 μm. A pair of lead conductors may be connected to the respective external electrodes 30a and 30b.

The dielectric ceramic material according to the present invention is described with reference to experiments.

$BaCO_3$, $SrCO_3$, $TiO_2$, and $ZrO_2$ were prepared as starting materials. The $BaCO_3$ and $TiO_2$, $SrCO_3$ and $TiO_2$, and $BaCO_3$ and $ZrO_2$, were weighed and mixed with one another to provide, after prefiring, $(BaO)_a \cdot TiO_2$, $(SrO)_a \cdot TiO_2$, and, $(BaO)_a \cdot ZrO_2$, respectively. The starting materials were dehydrated, dried, mixed, and then prefired at a temperature of from 1000° to 1240° C. for 2 hours. The prefired bodies were finely crushed to a fine powder having the respective compositions of $(BaO)_a \cdot TiO_2$, $(SrO)_a \cdot TiO_2$, and, $(BaO)_a \cdot ZrO$. To the fine powder, $MnCO_3$, $Co_3O_4$, $Nb_2O_5$, $Ta_2O_5$, $V_2O_5$, $Y_2O_3$, a rare earth oxide and $SiO_2$ were added and mixed to provide the compositions given in Table 1 after the final firing. The powder mixtures were dehydrated and dried. An appropriate amount of organic binder was added to the powder mixtures and they were then subjected to pressure-forming to obtain disc, 16.5 mm in diameter and 0.6 mm in thickness. A paste of nickel powder dispersed in an organic vehicle was applied on both sides of the discs by screen printing. The discs were placed on a zirconia plate, which was then placed in a bowl box and heated to 500° C. in an ambient atmosphere so as to burn the organic binder. Subsequently the firing was carried out at a temperature of from 1180° C. to 1300° C. for 2 hours in an $N_2$ atmosphere and an $N_2 + H_2$ atmosphere. The thus-manufactured specimens were subjected to measurement (measured at 1 kHz and 1 Vr.m.s.) of the specific dielectric constant ($\epsilon_s$), dielectric loss (tan δ, %), percentage change of capacitance depending upon the temperature of from −55° C. to 125° C. (ΔC/C, %), percentage change of capacitance when a DC bias (direct electric field of 750 V/mm) is applied and/second lapses ($\Delta C_{DC}/C$ %), percentage change ($\Delta C_{AG}/C$, %) of capacitance after 1000 hours at room temperature, and insulation resistance (IR, Ω) measured at 50 VD.C.

The results of the measurements and the x, y, z, a, α, β, t, w, A, and L values of the composition are given in Table 1.

In the composition according to the present invention, $(Ba_{1-x}Sr_xO)_aTi_{1-y}Zr_yO_2$ is one mole, α and β are mole %, and w is weight % based on 100 weight % of $(Ba_{1-x}Sr_xO)_aTi_{1-y}Zr_yO_2$.

TABLE 1

| Sample Nos. | Composition x | y | x+y+1.7αz | z | a | A | L | t | α (mol %) | β (mol %) | β/α | w (wt %) | Properties $\varepsilon_s$ | tan δ (%) | ΔC/C (%) (−55°C) | ΔC/C (%) (125°C) | $\Delta C_{DC}/C$ (%) | $\Delta C_{AG}/C$ (%) | IR (Ω·cm) Reduction | Sintering Property | Sintering Temperature (°C) |
|---|---|---|---|---|---|---|---|---|---|---|---|---|---|---|---|---|---|---|---|---|---|
| *1 | 0.040 | 0 | 0.040 | 0 | 0.985 | Nb | — | 0 | 0.20 | 0.02 | 0.10 | 0.003 | — | — | — | — | — | — | 2.0 × 10¹¹ Reduction | Good | 1300 |
| *2 | 0.040 | 0 | 0.040 | 0 | 1.025 | " | — | 0 | 0.20 | 0.02 | 0.10 | 0.003 | 1800 | 0.2 | +12.0 | +15.0 | +13.00 | not measured | 2.0 × 10¹¹ | Poor | 1400 |
| *3 | 0.001 | 0 | 0.001 | 0 | 1.010 | " | — | 0 | 2.00 | 0.10 | 0.05 | 0.030 | 3200 | 0.8 | −10 | +35 | +4.00 | −7.00 | 5.0 × 10¹² | Good | 1240 |
| 4 | 0 | 0 | 0.017 | 0.500 | 1.010 | " | — | 0 | 2.00 | 0.10 | 0.05 | 0.030 | 4500 | 0.5 | −5.0 | +13.00 | +4.30 | −7.00 | 4.0 × 10¹² | Good | 1240 |
| 5 | 0.040 | 0 | 0.057 | 0.500 | 1.010 | " | — | 0 | 2.00 | 0.10 | 0.05 | 0.020 | 3700 | 0.7 | −5.0 | +5.0 | +5.20 | −5.00 | 2.0 × 10¹² | Good | 1200 |
| 6 | 0.100 | 0 | 0.100 | 0 | 1.010 | " | — | 0 | 2.00 | 0.10 | 0.05 | 0.030 | 2500 | 0.3 | −6.0 | +2.0 | +7.00 | −7.00 | 3.0 × 10¹² | Good | 1220 |
| 7 | 0.240 | 0 | 0.240 | 0 | 1.010 | " | — | 0 | 2.00 | 0.10 | 0.05 | 0.030 | 2000 | 0.3 | +12.0 | −20.0 | +4.00 | −6.00 | 6.0 × 10¹² | Good | 1240 |
| *8 | 0.300 | 0 | 0.300 | 0 | 1.010 | " | — | 0 | 2.00 | 0.10 | 0.05 | 0.030 | 1200 | 0.3 | +5.0 | −60.0 | +2.00 | not measured | 7.0 × 10¹² | Good | 1240 |
| 9 | 0 | 0.050 | 0.050 | 0 | 1.010 | " | — | 0 | 2.00 | 0.10 | 0.05 | 0.003 | 3300 | 0.5 | −12.0 | +12.0 | +8.60 | −8.00 | 3.0 × 10¹² | Good | 1240 |
| 10 | 0 | 0.100 | 0.100 | 0 | 1.010 | " | — | 0 | 0.500 | 0.020 | 0.04 | 0.003 | 3200 | 0.4 | −17.0 | 0 | +8.00 | −9.00 | 1.4 × 10¹³ | Good | 1240 |
| 11 | 0.025 | 0.025 | 0.050 | 0 | 1.010 | " | — | 0 | 0.500 | 0.020 | 0.04 | 0.010 | 3500 | 0.5 | −10.0 | +12.0 | +9.00 | −8.00 | 1.7 × 10¹³ | Good | 1240 |
| *12 | 0.300 | 0 | 0.300 | 0 | 1.010 | " | — | 0 | 0.500 | 0.020 | 0.04 | 0.003 | 1600 | 0.5 | +18.0 | −52.0 | +8.50 | not measured | 2.4 × 10¹³ | Good | 1240 |
| 13 | 0.040 | 0 | 0.040 | 0 | 0.990 | " | — | 0 | 3.000 | 0.06 | 0.02 | 0.003 | 2800 | 1.1 | −14.0 | +4.0 | +8.00 | −7.20 | 3.2 × 10¹¹ | Good | 1200 |
| 14 | 0.040 | 0 | 0.040 | 0 | 1.000 | " | — | 0 | 3.000 | 0.100 | 0.033 | 0.020 | 3900 | 1.2 | −7.0 | +8.0 | +7.00 | −7.80 | 4.0 × 10¹² | Good | 1200 |
| 15 | 0.040 | 0 | 0.040 | 0 | 1.015 | " | — | 0 | 2.00 | 0.100 | 0.050 | 0.100 | 3800 | 0.5 | +3.0 | +11.0 | +5.40 | −5.10 | 3.0 × 10¹² | Good | 1200 |
| *16 | 0 | 0 | 0.024 | 1.000 | 1.005 | " | — | 0 | 2.00 | 0.010 | 0.050 | 0.020 | 4500 | 2.0 | −3.0 | +5.0 | not measured | not measured | 6.0 × 10⁹ | Good | 1200 |
| 17 | 0 | 0 | 0.032 | 0.94 | 1.010 | " | — | 0 | 2.00 | 0.10 | 0.050 | 0.020 | 4200 | 0.8 | −10.00 | +5.00 | +4.00 | −6.30 | 1.0 × 10¹² | Good | 1220 |
| 18 | 0.020 | 0.020 | 0.076 | 0.070 | 1.010 | " | — | 0 | 3.00 | 0.10 | 0.033 | 0.020 | 4000 | 0.7 | −8.20 | +8.00 | +5.10 | −7.10 | 8.0 × 10¹¹ | Good | 1220 |
| *19 | 0.040 | 0 | 0.048 | 0.985 | 1.000 | " | — | 0 | 0.50 | 0.05 | 0.10 | 0.020 | 4300 | 2.8 | −4.3 | +10.00 | not measured | not measured | 8.0 × 10⁹ | Good | 1220 |
| 20 | 0.030 | 0 | 0.050 | 0.02 | 1.010 | Ta | — | 0 | 0.50 | 0.01 | 0.02 | 0.050 | 3800 | 0.7 | −7.50 | +13.00 | +7.00 | −4.20 | 2.0 × 10¹² | Good | 1220 |
| 21 | 0.030 | 0 | 0.077 | 0.50 | 1.010 | " | — | 0 | 2.00 | 0.10 | 0.05 | 0.020 | 4000 | 0.7 | −13.0 | +15.00 | +9.00 | −3.50 | 7.0 × 10¹² | Good | 1220 |
| 22 | 0.030 | 0 | 0.077 | 0.50 | 1.010 | " | La | 0.50 | 2.00 | 0.10 | 0.05 | 0.100 | 3500 | 0.7 | −5.00 | +17.00 | +8.30 | −4.00 | 3.0 × 10¹² | Good | 1220 |
| 23 | 0.040 | 0 | 0.040 | 0 | 1.010 | " | — | 0 | 2.00 | 0.20 | 0.40 | 0.010 | 3800 | 0.5 | −14.00 | +20.00 | +3.20 | −2.00 | 2.0 × 10¹² | Good | 1220 |
| *24 | 0.040 | 0 | 0.040 | 0 | 1.010 | " | — | 0 | 0.50 | 0.30 | 0.60 | 0.005 | 6000 | 12.0 | not measured | not measured | not measured | not measured | 2.0 × 10⁸ | Good | 1220 |
| 25 | 0.030 | 0 | 0.050 | 0.02 | 1.010 | V | — | 0 | 0.50 | 0.01 | 0.02 | 0.050 | 4000 | 0.6 | −10.50 | +15.20 | +5.70 | −5.40 | 1.8 × 10¹² | Good | 1220 |
| 26 | 0.030 | 0 | 0.077 | 0.50 | 1.010 | " | — | 0 | 2.00 | 0.10 | 0.05 | 0.020 | 3800 | 0.5 | −20.00 | +18.50 | +4.00 | −7.00 | 2.0 × 10¹³ | Good | 1220 |
| 27 | 0.030 | 0 | 0.077 | 0.50 | 1.010 | " | La | 0.50 | 2.00 | 0.10 | 0.05 | 0.020 | 3700 | 0.5 | −13.00 | +14.00 | +6.90 | −8.00 | 2.0 × 10¹² | Good | 1220 |
| *28 | 0.040 | 0 | 0.040 | 0 | 1.010 | " | — | 0 | 0.50 | 0.30 | 0.60 | 0.020 | 5600 | 9.0 | not measured | not measured | not measured | not measured | 6.0 × 10⁸ | Good | 1220 |
| 29 | 0.040 | 0 | 0.040 | 0 | 1.010 | Nb | — | 0 | 0.50 | 0.20 | 0.40 | 0.020 | 4400 | 0.5 | −10.50 | +25.00 | +8.00 | −7.00 | 9.0 × 10¹² | Good | 1320 |
| 30 | 0.040 | 0 | 0.040 | 0 | 1.010 | " | — | 0 | 2.00 | 0.40 | 0.50 | 0.020 | 3900 | 1.0 | −12.00 | +5.00 | +7.50 | −7.00 | 2.0 × 10¹² | Good | 1220 |
| *31 | 0.040 | 0 | 0.040 | 0 | 1.010 | " | — | 0 | 0.50 | 0.30 | 0.60 | 0.020 | 6500 | 11.0 | not measured | not measured | not measured | not measured | 7.0 × 10⁸ | Good | 1300 |
| *32 | 0.040 | 0 | 0.040 | 0 | 1.010 | " | — | 0 | 3.00 | 0.02 | 0.007 | 0.020 | 2700 | 0.4 | −5.0 | +1.0 | +9.50 | −14.70 | 4.8 × 10¹¹ | Good | 1300 |
| 33 | 0.020 | 0.020 | 0.057 | 0.500 | 1.010 | " | — | 0 | 2.00 | 0.025 | 0.0125 | 0.010 | 3300 | 0.5 | −6.0 | +16.0 | +5.40 | −9.40 | 3.0 × 10¹² | Good | 1220 |
| *34 | 0.040 | 0 | 0.067 | 0.800 | 1.010 | " | — | 0 | 2.00 | 0.010 | 0.005 | 0.010 | 3200 | 0.5 | −4.0 | +3.2 | +3.80 | −20.00 | 2.0 × 10¹² | Good | 1300 |
| *35 | 0.000 | 0.040 | 0.040 | 0 | 1.010 | " | — | 0 | 3.00 | 0.02 | 0.007 | 0.010 | 2500 | 0.5 | −10.00 | +17.00 | +9.50 | −24.00 | 2.0 × 10¹² | Good | 1220 |
| 36 | 0.040 | 0 | 0.040 | 0 | 1.010 | " | La | 0.05 | 2.00 | 0.15 | 0.075 | 0.010 | 3400 | 0.7 | −14.00 | +14.00 | +7.00 | −6.40 | 7.0 × 10¹² | Good | 1240 |
| 37 | 0.040 | 0 | 0.040 | 0 | 1.010 | " | " | 0.25 | 2.00 | 0.20 | 0.10 | 0.010 | 3400 | 0.7 | −12.00 | +16.00 | +8.00 | −8.50 | 1.0 × 10¹³ | Good | 1240 |
| 38 | 0.040 | 0 | 0.040 | 0 | 1.010 | " | " | 0.80 | 2.00 | 0.20 | 0.10 | 0.010 | 3400 | 0.6 | −11.00 | +17.00 | +7.20 | −7.40 | 2.0 × 10¹³ | Good | 1280 |
| 39 | 0.040 | 0 | 0.040 | 0 | 1.010 | " | " | 0.95 | 2.00 | 0.20 | 0.10 | 0.010 | 3000 | 0.5 | −5.00 | +19.00 | +6.00 | −6.90 | 2.0 × 10¹³ | Good | 1280 |
| *40 | 0.040 | 0 | 0.040 | 0 | 1.010 | " | " | 0.99 | 2.00 | 0.20 | 0.10 | 0.010 | 2000 | 0.3 | −4.00 | +30.00 | +6.00 | −2.00 | 9.0 × 10¹⁰ | Poor | 1400 |

TABLE 1-continued

| Sample Nos. | Composition | | | | | | | | | | | | | Properties | | | | | | | Sintering Temperature (°C.) |
|---|---|---|---|---|---|---|---|---|---|---|---|---|---|---|---|---|---|---|---|---|---|
| | x | y | x + y + 1.7 az | z | a | A | L | t | α (mol %) | β (mol %) | β/α | w (wt %) | $\epsilon_s$ | tan δ (%) | ΔC/C (%) (−55° C.) | ΔC/C (%) (125° C.) | $\Delta C_{DC}/C$ (%) | $\Delta C_{AG}/C$ (%) | IR (Ω·cm) | Sintering Property | |
| 41 | 0.040 | 0 | 0.040 | 0 | 1.010 | " | Y | 0.05 | 2.00 | 0.15 | 0.075 | 0.010 | 3600 | 0.4 | −14.00 | +13.50 | +7.00 | −4.00 | $2.0 \times 10^{12}$ | Good | 1200 |
| 42 | 0.040 | 0 | 0.040 | 0 | 1.010 | " | " | 0.25 | 2.00 | 0.20 | 0.10 | 0.010 | 3700 | 0.5 | −14.00 | +18.00 | +7.00 | −3.40 | $2.0 \times 10^{12}$ | Good | 1200 |
| 43 | 0.040 | 0 | 0.040 | 0 | 1.010 | " | " | 0.95 | 2.00 | 0.20 | 0.10 | 0.010 | 3400 | 0.7 | −14.00 | +14.00 | +7.00 | −8.00 | $3.0 \times 10^{12}$ | Good | 1240 |
| *44 | 0.040 | 0 | 0.040 | 0 | 1.010 | " | " | 0.99 | 2.00 | 0.20 | 0.10 | 0.010 | 2100 | 0.3 | +6.30 | +38.00 | +5.30 | −7.00 | $8.0 \times 10^{10}$ | Poor | 1400 |
| 45 | 0.040 | 0 | 0.040 | 0 | 1.010 | " | Ce | 0.05 | 2.00 | 0.15 | 0.075 | 0.010 | 3800 | 0.4 | −2.40 | +4.00 | +7.40 | −7.40 | $9.0 \times 10^{10}$ | Good | 1200 |
| 46 | 0.040 | 0 | 0.040 | 0 | 1.010 | " | " | 0.50 | 2.00 | 0.20 | 0.10 | 0.010 | 3600 | 0.6 | −0.10 | +7.00 | +6.50 | −7.20 | $1.6 \times 10^{12}$ | Good | 1220 |
| 47 | 0.040 | 0 | 0.040 | 0 | 1.010 | " | " | 0.95 | 2.00 | 0.20 | 0.10 | 0.010 | 3000 | 0.4 | +3.00 | +12.00 | +4.80 | −6.20 | $4.0 \times 10^{12}$ | Good | 1240 |
| *48 | 0.040 | 0 | 0.040 | 0 | 1.010 | " | " | 0.99 | 2.00 | 0.20 | 0.10 | 0.010 | 1700 | 0.3 | +8.20 | +29.00 | +4.90 | −6.40 | $2.0 \times 10^{11}$ | Poor | 1400 |
| *49 | 0.040 | 0 | 0.040 | 0 | 1.010 | " | — | 0 | 0 | 0 | — | 0.020 | 3000 | 4.0 | −5.0 | +60.00 | not measured | not measured | $1.0 \times 10^{11}$ | Poor | 1360 |
| 50 | 0.040 | 0 | 0.040 | 0 | 1.010 | " | — | 0 | 0.02 | 0.002 | 0.10 | 0.010 | 2900 | 0.9 | +15.00 | +21.00 | +7.20 | −9.20 | $2.0 \times 10^{12}$ | Good | 1260 |
| *51 | 0.040 | 0 | 0.040 | 0 | 1.010 | " | — | 0 | 0.005 | 0.001 | 0.20 | 0.020 | 3000 | 5.0 | −37.0 | +125.00 | not measured | not measured | $6.0 \times 10^{13}$ | Poor | 1360 |
| 52 | 0.010 | 0.010 | 0.020 | 0 | 1.010 | " | — | 0 | 14.00 | 0.700 | 0.05 | 0.010 | 3200 | 0.1 | +14.00 | −18.00 | +9.80 | −9.00 | $8.0 \times 10^{11}$ | Good | 1220 |
| *53 | 0.010 | 0.010 | 0.020 | 0 | 1.010 | " | — | 0 | 18.00 | 0.900 | 0.05 | 0.010 | 2000 | 0.1 | +24.00 | −23.00 | +12.00 | −14.00 | $2.0 \times 10^{10}$ | Good | 1220 |
| *54 | 0 | 0 | 0.017 | 0.500 | 1.010 | " | — | 0 | 2.00 | 0.100 | 0.05 | 0.001 | 4000 | 0.5 | −5.00 | +13.00 | +14.30 | −7.20 | $3.0 \times 10^{12}$ | Good | 1240 |
| 55 | 0.040 | 0 | 0.040 | 0 | 1.010 | " | — | 0 | 2.00 | 0.100 | 0.05 | 0.001 | 4100 | 0.5 | +3.0 | +9.50 | +15.00 | −7.70 | $2.0 \times 10^{12}$ | Good | 1240 |
| *56 | 0 | 0.040 | 0.050 | 0 | 1.010 | " | — | 0 | 2.00 | 0.100 | 0.05 | 0.10 | 3800 | 0.3 | −11.00 | +14.00 | +23.40 | −9.50 | $3.0 \times 10^{12}$ | Good | 1200 |
| 57 | 0 | 0 | 0.017 | 0.500 | 1.010 | " | — | 0 | 2.00 | 0.100 | 0.05 | 0.10 | 4200 | 0.5 | −3.00 | +8.00 | +5.20 | −7.80 | $2.0 \times 10^{11}$ | Good | 1200 |
| 58 | 0 | 0 | 0.017 | 0.500 | 1.010 | " | — | 0 | 2.00 | 0.100 | 0.05 | 0.90 | 2800 | 1.0 | −11.00 | +13.00 | +9.50 | −8.20 | $9.0 \times 10^{11}$ | Good | 1200 |
| *59 | 0 | 0 | 0.017 | 0.500 | 1.010 | " | — | 0 | 2.00 | 0.100 | 0.05 | 1.20 | 1600 | 1.7 | −9.00 | +60.0 | +13.00 | not measured | $5.0 \times 10^{11}$ | Good | 1200 |
| 60 | 0 | 0 | 0.040 | 0 | 1.010 | " | — | 0 | 2.00 | 0.100 | 0.05 | 0.10 | 4200 | 0.7 | +4.00 | +7.00 | +7.20 | −6.80 | $3.0 \times 10^{12}$ | Good | 1200 |
| 61 | 0 | 0 | 0.040 | 0 | 1.010 | " | — | 0 | 2.00 | 0.100 | 0.05 | 0.80 | 2200 | 0.7 | −1.00 | +6.00 | +9.50 | −7.20 | $2.0 \times 10^{12}$ | Good | 1200 |
| *62 | 0 | 0 | 0.040 | 0 | 1.010 | " | — | 0 | 2.00 | 0.100 | 0.05 | 1.20 | 1200 | 0.7 | −5.00 | +73.0 | +14.00 | −6.50 | $3.0 \times 10^{12}$ | Good | 1200 |
| 63 | 0.003 | 0 | 0.003 | 0 | 1.010 | ¼ Nb | — | 0 | 3.00 | 0.100 | 0.033 | 0.100 | 3300 | 0.5 | −10.00 | +25.00 | +7.00 | −8.00 | $2.0 \times 10^{12}$ | Good | 1220 |
| 64 | 0.030 | 0 | 0.030 | 0 | 1.010 | ¼ Ta | — | 0 | 2.00 | 0.100 | 0.050 | 0.020 | 4200 | 0.4 | −7.20 | +4.00 | +7.20 | −7.20 | $2.4 \times 10^{12}$ | Good | 1220 |
| 65 | 0.030 | 0 | 0.030 | 0 | 1.010 | ¼ V | — | 0 | 2.00 | 0.100 | 0.050 | 0.020 | 3900 | 0.4 | −8.40 | +10.20 | +6.00 | −7.00 | $2.4 \times 10^{12}$ | Good | 1220 |
| 66 | 0.030 | 0 | 0.030 | 0 | 1.010 | ¼ Nb ¼ V | — | 0 | 2.00 | 0.100 | 0.050 | 0.020 | 4100 | 0.4 | −6.50 | +8.00 | +5.00 | −8.00 | $4.0 \times 10^{12}$ | Good | 1220 |

The samples marked with an asterisk are comparative samples having a composition outside the present invention.

The properties of the samples according to the present invention are as follows.

A. The relative dielectric constant ($\epsilon_s$) is in the range of from 2000° to 4500° C. and is high.

B. The percentage change of capacitance ($\Delta C/C$) depending upon temperature is small.

C. The relative dielectric constant ($\epsilon_s$) is particularly high when the composition is such that the percentage change of capacitance ($\Delta C/C$) depending upon temperature is within ±15%.

D. The dielectric loss (tan $\delta$) is in the range of from 0.1 to 1.2% and is low.

E. The percentage change of capacitance ($\Delta C_{AG}/C$) after 1000 hours aging at room temperature is within 10% and low.

F. The percentage change of relative dielectric constant ($\Delta C_{DC}/C$), when the direct electric field of 750 V/mm is applied, is within ±10% and is low.

G. The insulation resistance (IR) at room temperature is high.

H. The firing temperature is relatively low.

The above properties are obtained by the composition:

$$(Ba_{1-x}Sr_xO)_aTi_{1-y}Zr_yO_2+\alpha((1-z)MnO+z\text{-}CoO)+\beta((1-t)A_2O_5+tL_2O_3)+wSiO_2,$$

wherein:
A = Nb, Ta, V;
L = Y or a rare earth element;
$0.002 \leq x+y+1.7\alpha z \leq 0.250$;
$0.000 \leq z \leq 0.980$;
$0.990 \leq a \leq 1.020$;
$0.010 \leq \alpha \leq 15.00$ (mol %);
$0.01 \leq \beta/\alpha \leq 0.55$;
$0.000 \leq t \leq 0.980$; and
$0.002 \leq w \leq 1.00$ (wt %).

The above numerals are limitative for the following reasons.

When "$x+y+1.7\alpha Z$" is less than 0.002, the percentage change of relative dielectric constant ($\Delta C/C$, %) depending upon temperature becomes high (c.f. No. 3). When "$x+y+1.7\alpha Z$" exceeds 0.250, the $\Delta C/C$ becomes high and the relative dielectric constant ($\epsilon_s$) becomes small (c.f. Sample No. 8 and 12). When "Z" exceeds 0.980, the insulation resistance (IR) becomes low and the dielectric loss (tan $\delta$) becomes high (Sample Nos. 16 and 19). When "a" is less than 0.990, the insulation resistance (IR) becomes low and the dielectric loss (tan $\delta$) becomes high (c.f. Sample No. 1). When "a" is more than 1.020, the sintering property becomes poor (c.f. Sample No. 2). When "$\alpha$" is less than 0.010 mole %, the dielectric loss (tan $\delta$) becomes high, the percentage change of relative dielectric constant depending upon temperature ($\Delta C/C$) becomes high, and the sintering property becomes poor (Sample Nos. 49 and 51). When "$\alpha$" is more than 15 mole %, the relative dielectric constant ($\epsilon_s$) and the insulation resistance (IR) become low (c.f. Sample No. 53). When the ratio "$\beta/\alpha$" is less than 0.01, a high dielectric constant is not obtained, and the capacitance after aging at room temperature for 1000 hours is decreased by more than 10%, compared with the initial capacitance (c.f. Sample Nos. 32, 34, and 35). When the ratio "$\beta/\alpha$" is more than 0.55, the insulation resistance (IR) becomes low (c.f. Sample Nos. 24, 28, and 31). When "t" is more than 0.980, the relative dielectric constant ($\epsilon_s$) becomes low and the sintering property is impaired (Sample Nos. 40, 44, and 48). When "w" is less than 0.002 wt %, the percentage change of capacitance ($\Delta C_{DC}/C$) upon application of a direct current-field of 750 V/mm becomes more than +10% (Sample Nos. 54, 55, and 56). When "w" is more than 1 wt %, the relative dielectric constant ($\epsilon_s$) becomes low and the percentage change of capacitance ($\Delta C_{DC}/C$) upon application of a direct current-field becomes more than +10% (c.f. Sample Nos. 59 and 62).

Although in the above described example, Ba, Sr, and Mn in the form of carbonate, and the other elements in the form of oxide, are used, other forms of elements also can be used in the present invention.

We claim:

1. A dielectric, ceramic material having a composition:

$$(Ba_{1-x}Sr_xO)_aTi_{1-y}Zr_yO_2+\alpha((1-z)MnO+z\text{-}CoO)+\beta((1-t)A_2O_5+tL_2O_3)+wSiO_2,$$

wherein:
A = Nb, Ta, V;
L = Y or a rare earth element;
$0.002 \leq x+y+1.7\alpha z \leq 0.250$;
b $0.000 \leq z \leq 0.980$;
$0.990 \leq a \leq 1.020$;
$0.010 \leq \alpha \leq 15.00$ (mol %);
$0.01 \leq \beta/\alpha \leq 0.55$;
$0.000 \leq t \leq 0.980$; and
$0.002 \leq w \leq 1.00$ (wt %).

2. A monolithic capacitor comprising:
a plurality of layers of dielectric ceramic composition $(Ba_{1-x}Sr_xO)_aTi_{1-y}Zr_yO_2+\alpha((1-z)MnO+z\text{-}CoO)+\beta((1-t)A_2O_5+tL_2O_3)+wSiO_2$, wherein:
A = Nb, Ta, V;
L = Y or a rare earth element;
$0.002 \leq x+y+1.7\alpha z \leq 0.250$;
$0.000 \leq z \leq 0.980$;
$0.990 \leq a \leq 1.020$;
$0.010 \leq \alpha \leq 15.00$ (mol %);
$0.01 \leq \beta/\alpha \leq 0.55$;
$0.000 \leq t \leq 0.980$; and,
$0.002 \leq w \leq 1.00$ (wt %);

a plurality of layers of base metal electrodes, each layer being bonded between a pair of the dielectric ceramic compositions; and, a pair of external electrodes electrically and selectively connected to the base metal electrodes.

3. A monolithic capacitor according to claim 2, wherein said base metal electrodes consist essentially of at least one metal selected from the group consisting of Ni, Fe, Co, Cr, W and Mo.

4. A monolithic capacitor according to claim 3, wherein said base metal electrodes consist essentially of Ni.

5. A monolithic capacitor according to claim 3, wherein a thickness of each of said base metal electrodes is from 2 to 5 microns.

6. A monolithic capacitor according to claim 2, wherein a thickness of layers of dielectric material is from 20 to 40 microns.

7. A monolithic capacitor according to claim 3 or 6, wherein said monolithic capacitor is produced by firing monolithic materials capable of yielding said dielectric ceramic composition and base metal in a reducing or non-oxidizing atmosphere.

8. A monolithic capacitor according to claim 7, wherein the firing is carried out at a temperature of from 1180° to 1300° C.

9. In a method for producing a monolithic ceramic body comprising a plurality of dielectric ceramic layers and a plurality of electrodes, each of which is bonded between a pair of the ceramic layers, comprising the steps of:

mixing finely divided compounds to obtain a predetermined composition which yields a barium titanate-based ceramic after firing;

rendering said predetermined composition into a moldable state;

forming sheets of said predetermined composition, for providing said plurality of dielectric ceramic layers, after the firing;

forming a predetermined pattern of material on said sheets, which material is capable of forming a base metal electrode, after the firing;

laminating said sheets having the predetermined pattern of material to each other, thereby sandwiching each of the predetermined patterns of material between a pair of said sheets; and, firing the laminated sheets and material in a reducing or non-oxidizing atmosphere, an improvement comprises:

separately preparing compounds expressed by $BaTiO_3$, $SrTiO_3$, $BaZrO_3$, and $SrZrO_3$, respectively, and finely dividing said compounds;

adding an Mn-oxide-bearing material, a Co oxide-bearing material, a material bearing an oxide of at least one element selected from the first group consisting of Nb, Ta, and V, and a material bearing an oxide of at least one element selected from the second group consisting of Y and a rare earth element, to said separately prepared compounds; and mixing them so as to obtain a barium titanate-based composition having a formula $$(Ba_{1-x}Sr_xO)_aTi_{1-y}Zr_yO_2 + \alpha((1-z)MnO + zCoO) + \beta((1-t)A_2O_5 + tL_2O_3) + wSiO_2,$$

wherein:
A = Nb, Ta, V;
L = Y or a rare earth element;
$0.002 \leq x + y + 1.7\alpha z \leq 0.250$;
$0.000 \leq z \leq 0.980$;
$0.990 \leq a \leq 1.020$;
$0.010 \leq \alpha \leq 15.00$ (mol %);
$0.01 \leq \beta/\alpha \leq 0.55$;
$0.000 \leq t \leq 0.980$; and,
$0.002 \leq w \leq 1.00$ (wt %).

10. A method according to claim 9, wherein the firing is carried out at a temperature of from 1180° to 1300° C.

11. A method according to claim 9, wherein said preparation step comprises:

forming $BaTiO_3$, $SrTiO_3$, $BaZrO_3$, and $SrZrO_3$ by pre-firing at a temperature of from 1000° to 1240° C.

12. A method according to claim 11, wherein said Mn-oxide bearing material is $MnCO_3$, said Co-oxide bearing material is $Co_3O_4$, said material bearing an oxide of at least one element selected from the first group consisting of Nb, Ta, and V is $Nb_2O_5$, $Ta_2O_5$ or $V_2O_5$, and said material bearing an oxide of at least one element selected from the second group consisting of Y and a rare earth element is $Y_2O_3$ or an oxide of the rare earth element.

* * * * *